United States Patent [19]

Lovegrove

[11] 4,371,069
[45] Feb. 1, 1983

[54] SAFETY INTERLOCK

[75] Inventor: Peter J. Lovegrove, Lowestoft, England

[73] Assignee: Weatherford U.K. Limited, England

[21] Appl. No.: 193,123

[22] Filed: Oct. 2, 1980

[30] Foreign Application Priority Data

Oct. 2, 1979 [GB] United Kingdom ............... 7934201

[51] Int. Cl.³ .......................... F16P 3/08; B25B 17/00
[52] U.S. Cl. .................................. 192/135; 81/57.15; 192/133
[58] Field of Search ............... 192/135, 133; 81/57.15, 81/57.16, 57.17, 57.18, 57.19, 57.2, 57.21

[56] References Cited

U.S. PATENT DOCUMENTS

| 639,685 | 12/1899 | O'Connell | 192/135 |
|---|---|---|---|
| 2,794,528 | 6/1957 | King | 192/135 X |
| 3,023,651 | 3/1962 | Wallace | 81/57.2 X |
| 4,170,907 | 10/1979 | Cathcart | 81/57.15 X |
| 4,212,212 | 7/1980 | Chandler et al. | 81/57.2 X |
| 4,215,602 | 8/1980 | Carstensen et al. | 81/57.21 X |

Primary Examiner—Rodney H. Bonck
Attorney, Agent, or Firm—Bacon & Thomas

[57] ABSTRACT

A safety interlock between a machine guard and a machine actuator, comprising locking means for the guard and locking means for the actuator, the guard locking means being arranged, upon closing of the guard, to engage and thereby release the actuator locking means and to be held in a guard locking condition by such engagement while the machine is actuated.

9 Claims, 3 Drawing Figures

SAFETY INTERLOCK

This invention relates to the safeguarding of machinery and is directed to the provision of an improved safety interlock between a machine guard and actuating means of the machine.

Thus viewed from one aspect the invention provides a safety interlock between a machine guard and a machine actuator, comprising locking means for the guard and locking means for the actuator, the guard locking means being arranged, upon closing of the guard, to engage and thereby release the actuator locking means and to be held in a guard locking condition by such engagement whilst the machine is actuated.

Such an interlock according to the invention has the advantage, as compared with earlier and more complex devices, that the single action of closing the guard both enables actuation of the machine and locks the guard in its closed position for the duration of such actuation.

An embodiment of the invention will now be described by way of example and with reference to the accompanying drawings, in which.

Figure 1:
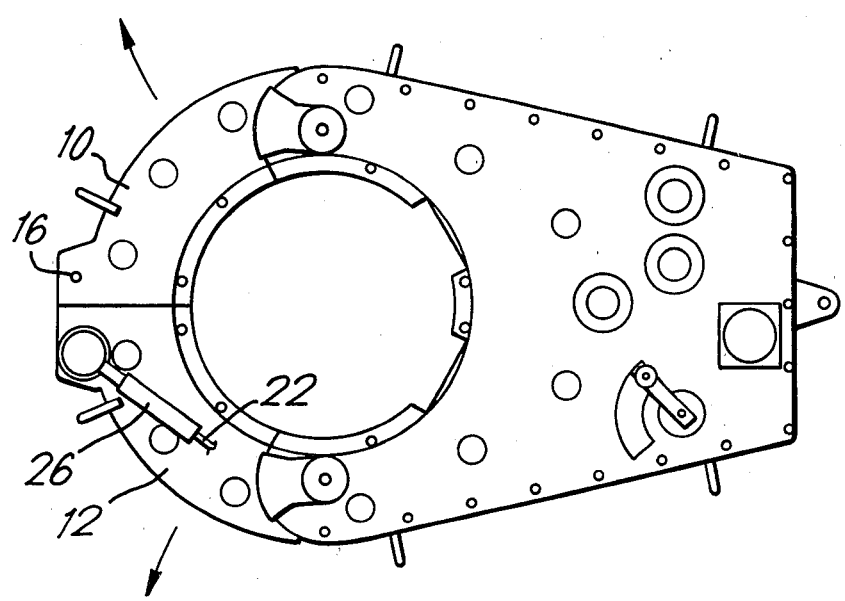
FIG. 1 is a plan view of a pipe tong incorporating a safety interlock according to the invention.
Figure 2:
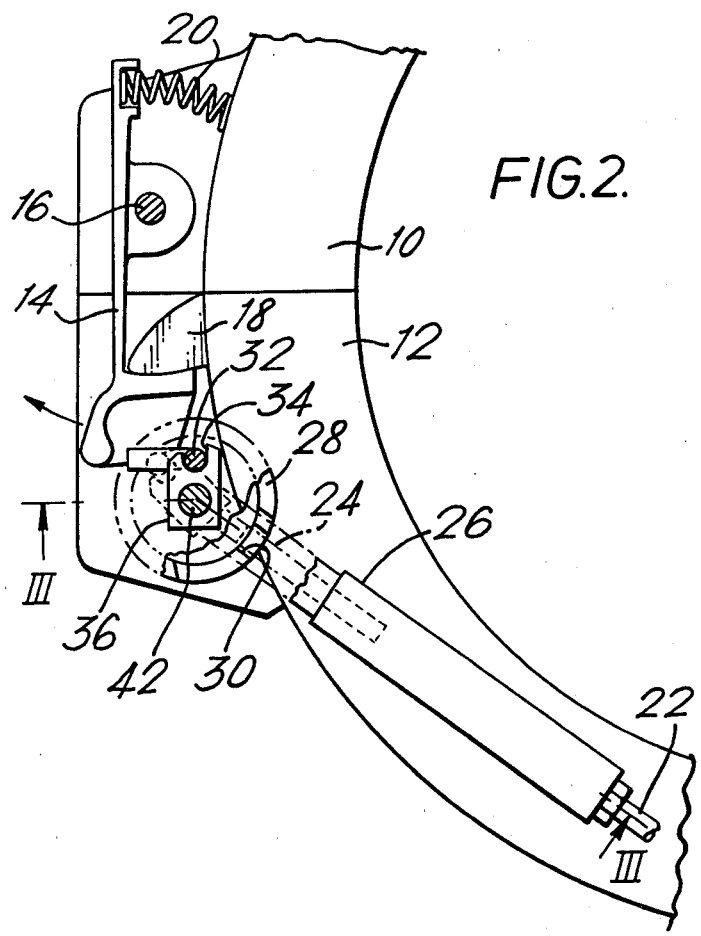
FIG. 2 is a plan view of the mechanism of the safety interlock.
Figure 3:
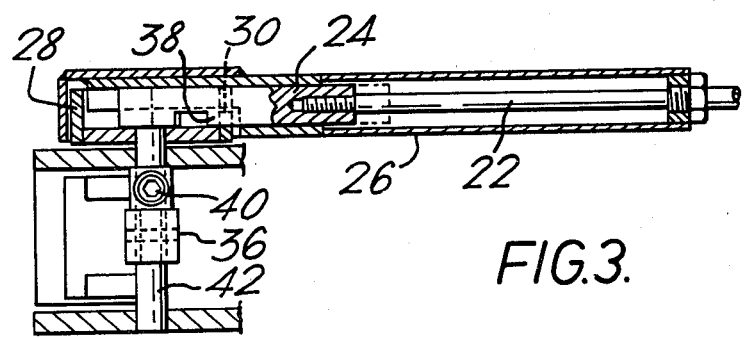
FIG. 3 is a cross-section on the line III—III of FIG. 2.

Referring to the drawings and in particular to FIGS. 2 and 3, 10 and 12 are two machine guards in the form of hinged doors of the pipe tong, shown in their closed condition. Securing means for the doors comprises a latch 14 pivotally mounted at 16 on door 10 and engageable with a hook 18 on door 12 to hold the doors closed. A compression spring 20 biases the latch to its locking position.

An actuator (not shown) for the drill pipe screwing machinery, for example the spool of a control valve of a hydraulic motor, is connected by a push-pull cable 22 to move a shaft 24 in sliding fashion in its housing 26. A locking member for the actuator shaft comprises an annular locking ring 28 rotatably mounted on door 12 and formed with a slot 30 through which shaft 24 passes. Guard locking means in the form of a pin 32 on the latch 14 is engageable in a slot 34 in a holding member of the actuator locking means comprising a block 36 fixed on the same shaft 42 as the locking ring 28. When the door 10 is closed the pin 32 rotates the block 34 from the ghost line to the full line position shown in FIG. 2, thus rotating ring 28 to a position in which a blocking portion 38 of the shaft 24 is movable into the slot 34 in the ring 24 upon operation of the machine actuator to pull the cable 22. At the same time the pin 32 becomes trapped in the slot 34. Thus the door locking means (pin 32) is arranged, upon closing of the door 10, to engage and thereby release the actuator locking means (block 36 and ring 28) and to be held in its locked condition (pin 32 being trapped in slot 34) by such engagement whilst the machinery is actuated. When the actuator shaft is returned upon deenergisation of the actuator, the locking ring 28 is once again free to rotate so that the latch can be released and the doors opened. A spring-actuated catch is provided at 40 for releasably holding the block 36 in the ghost line (pin releasing) position of FIG. 1.

I claim:

1. A safety interlock between a machine guard and a machine actuator comprising:
   (a) locking means for the guard being arranged, upon closing of the guard, to engage and thereby release an actuator locking means, and to be held in a guard locking condition by such engagement while the machine is actuated; and,
   (b) actuator locking means including a holding member for the guard locking means, said holding member being mounted for movement buy the guard locking means between holding and releasing positions for such locking means, said holding member further being formed with a recess for receiving the guard locking means, the opening of said recess facing the direction of guard closing movement of said locking means when in its releasing position, but facing transversely of said direction when in its holding position so that a side wall of the recess blocks guard opening movement of the locking means.

2. A safety interlock as claimed in claim 1, wherein the movement of the actuator locking means including the said holding member is rotary.

3. A safety interlock as claimed in claim 1, wherein the opening in the actuator locking member is, when in an actuator releasing position of said locking means corresponding to the holding position of said holding member, aligned with a movable member connectible to the machine actuator to permit actuating movement thereof to a position in which movement of said locking member, and thereby also movement of said holding member, is prevented.

4. A safety interlock as claimed in claims 2 or 3, wherein the said actuator locking member comprises an axially rotatable annular wall formed with said opening.

5. A safety interlock as claimed in claim 4, wherein the said movable member is a rectilinearly movable bar.

6. A safety interlock as claimed in claim 5, wherein the said bar permanently spans the said wall and is formed with a slot to permit rotation of the wall when the machine is not actuated.

7. A safety interlock as claimed in claim 1, wherein the guard locking means and the actuator locking means are mounted on respective members of a two-part machine guard.

8. A safety interlock as claimed in claim 7, wherein both of said guard members are mounted for opening and closing movement.

9. A safety interlock as claimed in claim 1, wherein the said guard is that of a pipe tong mechanism for gripping the pipes of a drill string.

* * * * *